G. W. HUNTER.

Assignor, by mesne Assignments, of part interest to H. M. BAKER, W. F. STONE, & J. H. VERMILYA.

Shuttle for Sewing-Machine.

No. 8,285. Reissued June 11, 1878.

Witnesses:
M. Georgii
W. T. Hutchinson

George W. Hunter
Inventor:
by his attorney
M. Bailey

N. PETERS, PHOTO-LITHOGRAPHER, WASHINGTON, D. C.

UNITED STATES PATENT OFFICE.

GEORGE W. HUNTER, OF WASHINGTON, DISTRICT OF COLUMBIA, ASSIGNOR, BY MESNE ASSIGNMENTS, OF PART INTEREST TO HENRY M. BAKER, WILLIAM F. STONE, AND JAMES H. VERMILYA, OF SAME PLACE.

IMPROVEMENT IN SHUTTLES FOR SEWING-MACHINES.

Specification forming part of Letters Patent No. 145,348, dated December 9, 1873; Reissue No. 8,285, dated June 11, 1878; application filed May 28, 1878.

*To all whom it may concern:*

Be it known that I, GEORGE W. HUNTER, of Washington, District of Columbia, have invented certain new and useful Improvements in Sewing-Machine Shuttles, of which the following is a specification:

My invention relates to that kind of a sewing-machine shuttle that is cylindrically bored—a shuttle into which the bobbin is inserted at its open end; and it has for its principal object to provide a convenient arrangement for threading the same—that is to say, for entering the loose end of the thread, which afterward passes to the shuttle-tension and thence out from the shuttle. To accomplish this object I provide the shuttle with an open-ended slot, extending a proper distance from that end of the shuttle which the bobbin enters toward the other end of the shuttle. It is desirable that the slot should extend the length of the bobbin, and that, with the tension which I prefer to employ, the edge of the slot over which the thread passes to the tension should be curved or crescent-shaped, the convexity being toward the opposite edge of the slot.

The interior of the shuttle which receives the bobbin is cylindrical in shape, thus admitting the flanges or heads of the bobbin to be extended, and consequently its thread-holding capacity to be increased, and also removing liability of the thread becoming entangled by the needle when the bobbin is loose or without tension. I also form the shuttle with a depression or recess to receive a tension-spring, which, in conjunction with the surface of said sunken or depressed part of the shuttle, operates to exert tension on the thread passing between the two, the tension being further made adjustable in order that its action may be controlled and regulated at pleasure.

The nature of my invention, and the manner in which the same is or may be carried into effect, will be readily understood by reference to the accompanying drawing, in which—

Figure 1:
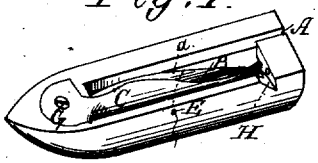
Figure 2:
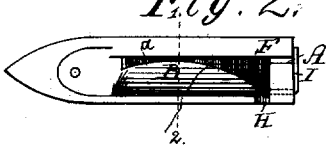
Figure 4:
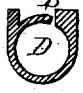
Figure 3:
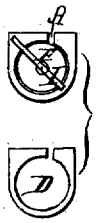
Figure 5:
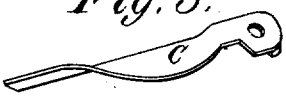
Figure 7:
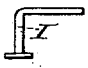
Figure 6:
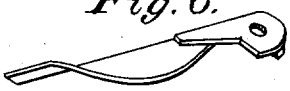

Figure 1 is a perspective view of a shuttle embodying my invention. Fig. 2 is a plan of the same with the tension-spring removed. Fig. 3 is an end elevation of the same from the rear, the upper figure showing the bobbin in position, and the lower figure showing the shuttle without the bobbin, and also without the swinging arm or strap hereinafter referred to. Fig. 4 is a section on the line 1 2, Fig. 2. Fig. 5 is a view on an enlarged scale of the tension-spring detached. Fig. 6 is a like view of the same spring, made in two pieces instead of one, as in Fig. 5. Fig. 7 represents, detached, the hinged strap or arm, which is swung across the open rear end of the shuttle in order to secure the bobbin in position therein.

The shuttle, as shown at D, is cylindrically bored for reception of the bobbin F, which is inserted into the shuttle through the open rear end of the same, and is there held in position or prevented from dropping out by means of a guard provided to close the shuttle end, this guard, in the present instance, consisting of the arm I, one part of which is inserted and secured, and has a rotary movement on its axis in the rear end of the shuttle at one side of the opening therein, while the other end, which is bent at right angles to the first, is arranged to overhang or extend across the opening in the shuttle, as shown in Fig. 3. This arm, owing to its arrangement above described, can be swung to one side whenever it is desired to leave the opening in the shuttle unobstructed, either for insertion or withdrawal of the bobbin. From the rear end of the shuttle extends the slot A, through whose open end the thread is entered, and thence drawn along until brought to the tension.

The tension which I have shown consists of a spring, C, which is seated or secured in a depression or recess, B, in the face of the shuttle, so formed that the spring will lie about flush with the face of the shuttle. The tension-spring is secured at its forward end to the shuttle by a screw, G, which can be turned so as to cause the spring to bear with more or less force on the thread, thus adjusting and regulating the tension. The rear or free end of the tension-spring is curved outwardly in order to provide for the easy reception of the thread, which, after entering the slot, is passed between the spring and the surface of the depressed part B, and thence out through a hole, E, in the top of the shuttle, above the plane of the spring. The thread drawn from the bobbin passes to the tension over the curved edge *a* of slot A, this edge being so formed in order to facilitate the delivering to the tension of the thread as it shifts from one point to another on the bobbin.

In the arrangement I have shown in illustration of my invention, it will be noted that the bobbin is without journals or journal-receiving depressions, and derives its support from the cylindrical shell against which its heads rest on their peripheries.

The open-ended slot A permits the shuttle to be most easily threaded, the loose end of the bobbin-thread being drawn into the slot through the open end of the same, either at the time the bobbin is inserted or afterward; and it thence passes to the tension with great ease. A notch, H, cut into the upper edge of the shuttle, reaching a little forward of the point to which the rear end of the tension-spring extends, facilitates the entering of the thread between the tension-spring and the face of the shuttle.

Having described my invention, what I claim, and desire to secure by Letters Patent, is as follows:

1. A cylindrically-bored shuttle provided with an open-ended slot for the passage of the bobbin-thread, substantially as set forth.

2. A cylindrically-bored shuttle provided with a tension and an open-ended slot for the passage of the bobbin-thread to the tension, substantially as set forth.

3. A cylindrically-bored shuttle recessed on its face and provided with a spring which is located therein and acts in conjunction with the surface of said recession to form a tension for the bobbin-thread, substantially as set forth.

4. A cylindrically-bored shuttle provided with an open-ended slot formed with a curved edge to facilitate the passage or delivery of the bobbin-thread, substantially as set forth.

5. A cylindrically-bored shuttle having its face provided with a curved or straight slot for the passage of the thread and with a tension-spring in a depression in such face, as and for the purpose described.

6. The cylindrically-bored shuttle provided in its face with an open-ended slot for the passage of the thread, as shown and described.

7. The shuttle having its face slotted, as described, when combined with a bobbin without journals or journal-receiving depressions, and with its heads resting against the shell of the shuttle.

In testimony that I claim the foregoing I have hereunto set my hand.

GEO. W. HUNTER.

Witnesses:
HENRY R. ELLIOTT,
M. GEORGII.